United States Patent [19]

Kuznetz

[11] Patent Number: 4,569,874
[45] Date of Patent: Feb. 11, 1986

[54] SPORTSWEAR FABRIC FOR COLD CLIMATES

[76] Inventor: Lawrence Kuznetz, 300 Central Park West, Apt. 7K, New York, N.Y. 10024

[21] Appl. No.: 724,119

[22] Filed: Apr. 17, 1985

[51] Int. Cl.⁴ .............................................. B32B 5/12
[52] U.S. Cl. ..................................... 428/109; 2/69.5; 2/272; 428/131; 428/137; 428/234; 428/246; 428/247; 428/252; 428/285; 428/398; 428/457; 428/913; 428/920
[58] Field of Search ............... 428/109, 131, 137, 138, 428/234, 246, 247, 252, 255, 300, 398, 284, 285, 457, 913, 920; 2/69.5, 272

[56] References Cited

U.S. PATENT DOCUMENTS

| | | | |
|---|---|---|---|
| 4,395,455 | 7/1983 | Fronkosky | 428/285 |
| 4,401,707 | 8/1983 | Barley et al. | 428/285 |
| 4,420,521 | 12/1983 | Carr | 428/138 |
| 4,433,019 | 2/1984 | Chumbley | 428/398 |
| 4,525,406 | 6/1985 | Pollock | 428/285 |

*Primary Examiner*—James J. Bell
*Attorney, Agent, or Firm*—Michael Ebert

[57] ABSTRACT

Sportswear suitable for a cold environment. Though light-weight and without undue bulk, the garment is adapted to keep the wearer warm, dry and comfortable. It is fabricated of a composite fabric that includes a vapor-permeable laminate formed by a core layer of hollow fibers acting as a thermal blanket sandwiched between inner and outer skins. Both faces of the inner skin and the inside face of the outer skin are metallized to render them reflective, whereas the outside face of the outer skin is blackened to render it absorbent of solar energy. When the garment is worn, radiant heat from the body is returned thereto by the reflective outside face of the inner skin while convection heat from the wearer's body passes by conduction through the inner skin of the laminate to be absorbed by the core layer. At the same time, solar heat absorbed by the blackened face is conducted through the outer skin to be absorbed by the core layer. The loss of infrared energy from the core layer is minimized by internal reflection from the reflective inside faces of the skins. Hence, the laminate functions as a bi-directional heat transfer trap with respect to convection heat derived from the wearer's body and heat derived from solar energy.

5 Claims, 3 Drawing Figures

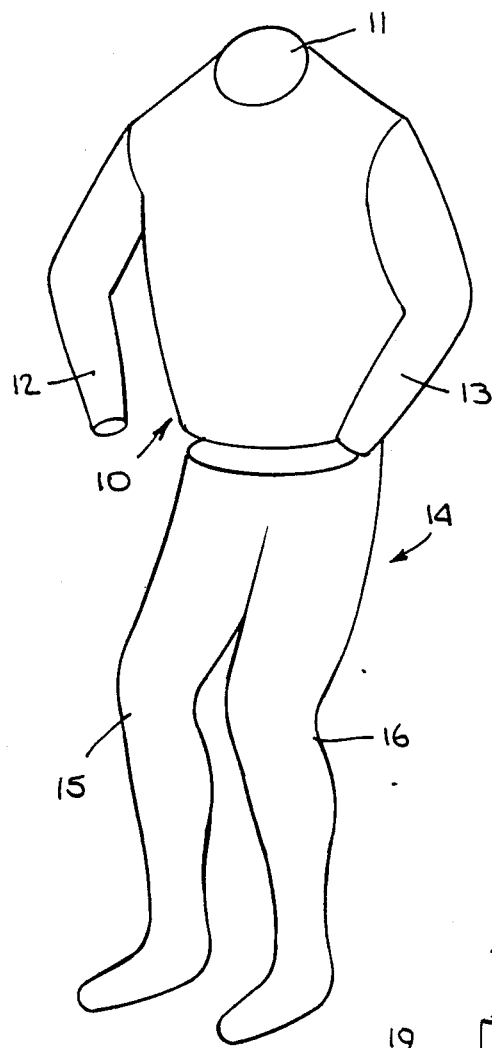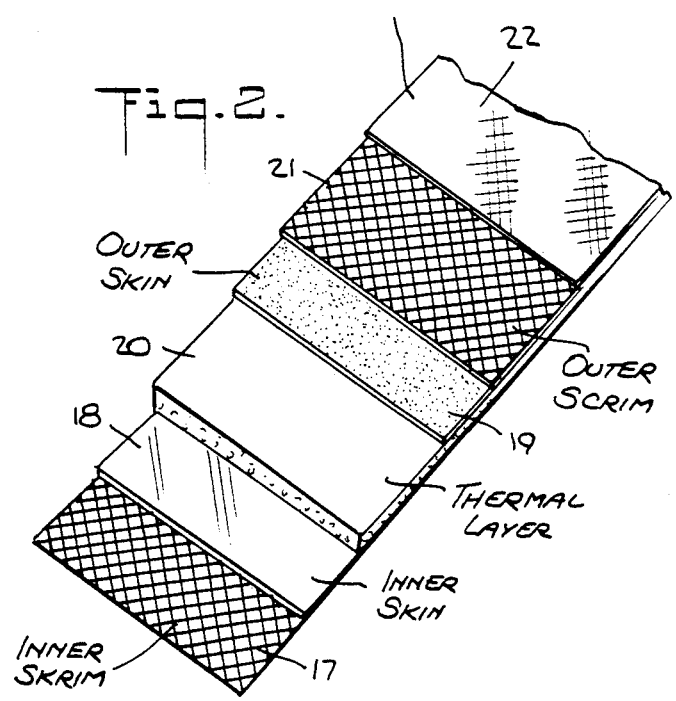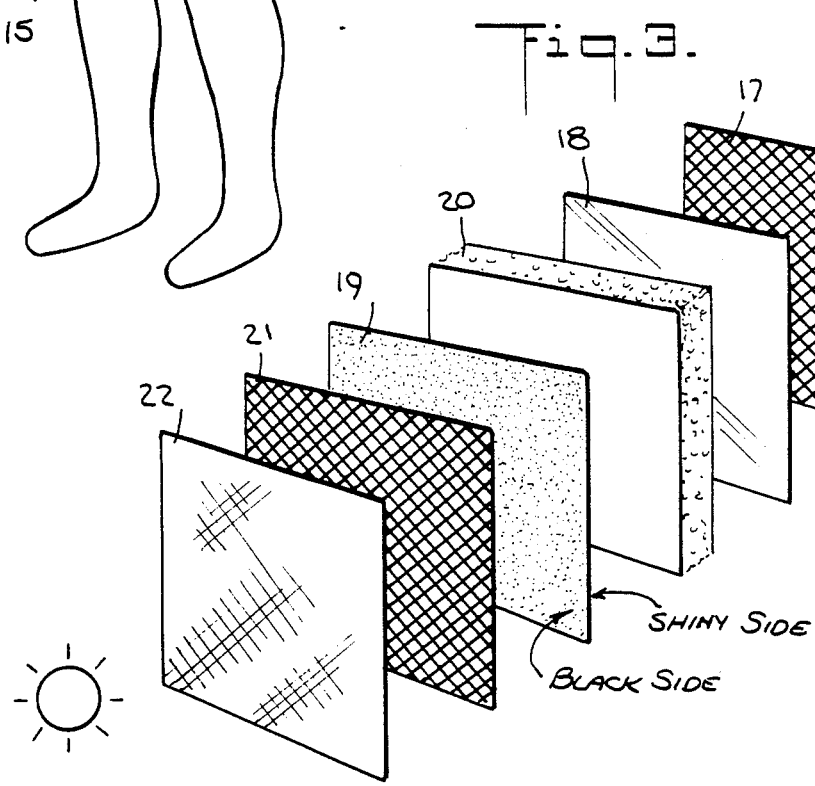

SPORTSWEAR FABRIC FOR COLD CLIMATES

BACKGROUND OF INVENTION

1. Field of Invention

This invention relates generally to fabrics for sportswear, and more particularly to a composite fabric for use in sportswear intended for skiers and other athletes who are active in a cold environment.

2. Status of Art

The clothing worn by athletes in competitive play in the course of which they undergo strenuous physical activity may adversely affect their performance. Because the fabric of wearing apparel more or less conforms to the body of the wearer and is interposed between the body and the atmosphere, it therefore acts effectively as a heat exchanger or thermal barrier, depending on its inherent characteristics.

The concern of the present invention is with garments for skiers and other athletes who perform in the open air in a cold and possibly windy and wet climate. The primary requirement for such sportswear is that it functions to keep its wearer warm and dry. It is also essential that the garment be light-weight and without undue bulk so as not to interfere with sports activity.

To some degree, these two requirements are incompatible; for one normally obtains warmth with heavily padded clothing, and a garment of this type is unsuitable for a skier or other athlete. The ideal clothing for an athlete whose sport is practiced in a cold environment is one which is light-weight and free of bulk; hence in no way interferes with freedom of movement, and yet thermally protects the wearer and keeps him warm and dry. It is also desireable that the garment be effectively waterproof, so that it protects the wearer when it rains or snows, yet be vapor-permeable so as not to seal in vapors emanating from a perspiring body and thereby give the wearer a clammy feeling.

By way of background to the invention, we shall now consider those factors which cause an athlete to generate body heat and those which give rise to a loss of body heat.

The transfer of heat, whether between a human body or an inanimate body and the surrounding atmosphere, takes place by three distinct processes: conduction, convection and radiation. In conduction, heat is transferred by the short range interaction of molecules and/or electrons. Convection involves the transfer of heat by the combined mechanisms of fluid mixing and conduction. In radiation, electromagnetic energy is emitted toward a body and the energy incident thereto is absorbed by the body to raise its temperature. Radiant heating, therefore, differs from both convection and conduction heating, for the presence of matter is not required for the transmission of radiant energy.

According to the Stefan-Boltzmann law, the rate of heat transfer between a source of radiated heat whose temperature is $T_s$ and an absorbing body whose temperature is $T_b$ is proportional to $T_s^4 - T_b^4$; that is, to the difference between the fourth powers of these temperature values. In convection heating, the rate of heat transfer is proportional only to the temperature difference between the body being heated and the surrounding atmosphere. Hence convection heating is inherently very slow as compared to the nearly instantaneous effects of radiant heating.

The interior of the human body has a normal temperature level which is usually said to be 98.6° F. But actually, in the course of each 24-hour period, the body temperature rises above and falls below this nominal value within a 5° F. range. Body temperature is determined by the relation existing between the amount of heat internally generated, which depends on basal metabolism, and the amount of heat escaping from the body. Additional heat is produced as a result of muscular activity, this being dissipated by an increase in radiation, conduction or evaporation from the skin surface by more rapid and deep breathing. Thus the skin is the interface between the internally heated body and the atmosphere.

In an intensely cold environment in which the ambient temperature is well below zero degrees centigrade, the temperature differential between the ambient temperature and the human body temperature is substantial. This differential results in heat transfer between the body and the environment at a rapid rate. Hence, unless the clothing worn by a skier is such as to interpose an effective thermal barrier between the wearer's body and the atmosphere, the skier may become dangerously cold.

In order to provide sports clothing which acts as an effective thermal barrier and yet is light-weight and free of bulk, it is now known in ski jackets and in other garments intended for use in a cold climate to provide a light-weight outer shell of nylon fabric or Gortex which acts as a waterproof windbreaker, yet is vapor-permeable. Because this shell affords little warmth, the shell is usually lined with a thin layer of non-woven hollow fibers which act to trap air and minimizes convection heat losses. Such hollow fiber layers are available commercially under various well-known trademarks such as "Thinsulate", "Hollofil", and "Qualofil".

While a "Thinsulate" or similar layer which lines the shell of a ski jacket minimizes the loss of heat from the body by convection, the heat absorbed by the "Thinsulate" layer from the body is radiated therefrom, and this radiation which results in a substantial loss of heat is not significantly impeded by the outer shell of the jacket. Hence, while the typical ski jacket which has a "Thinsulate" liner is light-weight and quite warm, even though lacking in bulk, it nevertheless falls well short of a skier's requirements in an intensely cold climate.

The effectiveness of a "Thinsulate" ski jacket is deceptive; for when the wearer is highly active with a resultant increase in the amount of internally-generated body heat, then the jacket is acceptably warm; but when the skier is being conveyed up a slope by a ski lift or is otherwise inactive, the thermal protection then afforded by the jacket may be inadequate.

SUMMARY OF THE INVENTION

In view of the foregoing, the main object of this invention is to provide a composite fabric for sportswear suitable for a cold and possibly windy and wet climate, the garment being adapted to keep the wearer warm, dry and comfortable under all conditions.

More particularly, an object of this invention is to provide a composite fabric which includes a vapor-permeable laminate that has a core-layer functioning as a thermal blanket, the laminate acting as a bi-directional heat transfer trap with respect to heat derived from the wearer's body and that derived from the sun.

Also an object of the invention is to provide a composite fabric which is light-weight and without undue bulk.

Briefly stated, these objects are attained in sportswear suitable for a cold environment. Though light-weight and without undue bulk, the garment is adapted to keep the wearer warm, dry and comfortable. It is fabricated of a composite fabric that includes a vapor-permeable layer laminate formed by a core layer of hollow fibers acting as a thermal blanket sandwiched between inner and outer skins. Both faces of the inner skin and the inside face of the outer skin are metallized to render them reflective, whereas the outside face of the outer skin is blackened to render it absorbent of solar energy. When the garment is worn, radiant heat from the body is returned thereto by the reflective outside face of the inner skin while convection heat from the wearer's body passes by conduction through the inner skin of the laminate to be absorbed by the core layer. At the same time, solar heat absorbed by the blackened face is conducted through the outer skin to be absorbed by the core layer. The loss of infrared energy from the core layer is minimized by internal reflection from the reflective inside faces of the skins, much in the same manner as multi-layer radiation shields used in ovens. Hence, the laminate functions as a bi-directional heat transfer trap with respect to convection heat derived from the wearer's body and heat derived from solar energy.

OUTLINE OF DRAWINGS

For a better understanding of the invention as well as other objects and further features thereof, reference is made to the following detailed description to be read in conjunction with the accompanying drawings, wherein:

FIG. 1 is a perspective view of one embodiment of sportswear in accordance with the invention;

FIG. 2 is a fanned-out view of the various components which form the fabric from which the sportswear is fabricated; and FIG. 3 is an exploded view of the fabric components.

DESCRIPTION OF INVENTION

Structure of Fabric

Referring now to FIG. 1, there is shown a sportswear garment fabricated from a composite fabric in accordance with the invention suitable for cold and possibly windy and wet environments. The garment is constituted by a pull-over top 10 having a neck opening 11 and long sleeves 12 and 13, and a separate pair of pants 14 having legs 15 and 16 whose feet are enclosed and therefore thermally insulated.

It is to be understood that the garment shown is but one of many possible embodiments, for the composite fabric in accordance with the invention may be used to fabricate ski jackets, windbreakers, coats and other articles of apparel for a cold climate.

The composite fabric, as shown in FIGS. 2 and 3, includes an inner open-mesh scrim 17, preferably formed of absorbent fibers of polypropylene, nylon or other synthetic fibers which have been texturized or otherwise processed to render them moisture-absorbent.

Also provided is a vapor-permeable laminate formed by an inner skin 18, an outer skin 19 and a thermal insulation core layer 20 sandwiched between these skins. Core layer 20 is preferably formed of hollow synthetic fibers of synthetic plastic material which act to trap air and minimize convection heat losses. Thus the core layer functions as a thermal blanket which, though thin, is effective for its intended purpose. As pointed out in the background section, a thermal layer of this type is commercially available under various trademarks, such as "Thinsulate."

The inner and outer skins 18 and 19 may be constituted by a porous, non-woven fabric formed of polyester or other synthetic fibers, or by a thin film material (2 to 5 mils) such as Mylar and Tyvek. The inner and outer skins 18 and 19 are laminated to the core layer 20 by needle-punching so that the resultant foraminated laminate is porous to permit the transfer of vapor therethrough. In the case of skins formed of normally non-permable films, these films are rendered porous by the needle-punching action.

The inside and outside faces of the inner skin 18 and the inside face of the outer skin 19 are metallized with aluminum or other reflective metal as by vacuum deposition or other known metallization techniques such as sputtering to provide a coating of molecular thickness. The outside face of the outer skin 19 is provided with a flat-black coating so as to render it highly absorbent of solar energy.

An outer protective, open mesh fabric or scrim 21, whose composition may be the same as that of the inner scrim 17, or simply a fine nylon mesh, lies against the blackened outside face of the outer skin 19 of the laminate. The final ply is an outer fabric shell 22 which is woven or otherwise fabricated of a material such as nylon which is permeable to solar radiation and to water vapor, yet is substantially waterproof. "Gortex" fabric is suitable for this purpose.

Operation of Fabric

The composition fabric of the sportswear garment, when worn by an athlete, has its inner scrim 17 adjacent the body 23 of the wearer, as shown in FIG. 3, and its outer shell 20 exposed to sunlight.

Inner scrim 17, because of its open-mesh construction, exposes the thermal laminate constituted by a core layer 20 and inner and outer skins 18 and 19 to radiant and convection heat as well as to perspiration or water vapor emanating from the surface of the wearer's body. Because of the permeable nature of the laminate, the water vapor is not blocked by the laminate but is transferred therethrough.

The outside reflective face of the inner skin 18 of the laminate acts to return infrared energy radiated from the wearer's body and thereby reduce the loss of heat. However, some convection or conduction heat from the body may not be reflected but instead may be conducted through inner skin 18 into the core layer 20 where it is absorbed.

At the same time, solar radiation passing through the outer shell 22 and the outer scrim 21 impinges on the blackened outside face of the outer skin 19 to heat this surface. The resultant heat energy is conducted through the outer skin 19 and is absorbed by the core layer 20.

Thus core layer 20 derives heat both from the body of the wearer and from the sun to which the wearer is exposed. Infrared radiation emitted from the inner side of the so-heated core layer is reflected back into the layer by the inside reflective face of the inner skin 18, while infrared radiation emitted from the outer side of the core layer is reflected back into the layer by the inside reflective face of the outer skin 19 of the laminate.

Hence, the laminate functions as a bi-directional heat transfer trap with respect to heat derived from the wearer's body and heat derived from solar energy. This operates in the manner of a visual image being reflected infinitely between two mirrors facing each other. Hence, the trapped heat is infinitely reflected between the two aluminum films facing each other. On the other hand, the laminate does not act as a trap with respect to water vapor from the skin of the wearer, and this vapor is discharged into the atmosphere through the outer shell 22 which acts only as a water barrier with respect to rain and snow.

Instead of an outer shell formed of woven "Gortex" or a similar waterproof fabric, use may be made of a fabric formed of acrylic or other fibers which are permeable to ultraviolet rays, but not to infrared radiation. Since the shell is spaced from the outer skin 19 of the laminate by outer mesh 21, the outer acrylic shell then effectively functions as glazing to provide a greenhouse effect to minimize the loss of infrared energy from the blackened outside face of outer skin 19.

Thus a composite fabric in accordance with the invention, though relatively thin and without undue bulk, is highly effective in a cold environment, for it acts to minimize the dissipation of body heat and also extracts heat from the sun to keep the wearer warm, dry and comfortable, even under the most rigorous environmental conditions.

While there has been shown and described a preferred embodiment of SPORTWEAR FABRIC FOR COLD CLIMATES in accordance with the invention, it will be appreciated that many changes and modifications may be made therein without, however, departing from the essential spirit thereof.

I claim:

1. A composite fabric for inclusion in sportswear intended for a cold and possibly windy and wet environment, said fabric comprising a laminate formed by a thin core layer formed of hollow fibers acting as a thermal blanket sandwiched between inner and outer skins formed of non-woven porous fabric and laminated thereto by needle punching to render the laminate permeable to vapor, the inside and outside faces of the inner skin and the inside face of the outer skin being metallized to render these faces reflective, the inside skin being adjacent the body of the wearer when the sportwear is worn, the outside face of the outer skin having a blackened coating thereon to render it absorbent of solar energy impinging on the sportswear, whereby infrared heat from the surface of the body of the wearer is reflected back to the body by the reflective outside face of the inner skin and convection heat from the surface of the body is conducted through the inner skin to be absorbed by the core layer which also absorbs heat from the blackened coating, infrared heat for the core layer being retained therein due to reflection from the reflective inside faces of the skins between which this layer is sandwiched whereby the laminate functions as a bi-directional heat transfer trap with respect to convection heat derived from the body and heat derived from solar energy.

2. A fabric as set forth in claim 1 further including an inner scrim of open mesh fabric secured to the inner skin.

3. A fabric as set forth in claim 1 further including an outer scrim of open mesh fabric secured to the outer skin.

4. A fabric as set forth in claim 3 further including a shell fabric secured to the outer scrim which is permeable to ultraviolet rays.

5. A fabric as set forth in claim 4 wherein said shell is waterproof and vapor permeable.

* * * * *